United States Patent [19]
Relin et al.

[11] Patent Number: 5,865,568
[45] Date of Patent: Feb. 2, 1999

[54] METHOD OF AND DEVICE FOR SUCTION TRANSPORTING

[76] Inventors: Arkadi Relin, 12 Woodbridge Pl., Langhorne, Pa. 19053; Michael Valdman, 30 Garrison St., Apt. 212, Boston, Mass. 02115; Simon Litvin, 276 Chestnut Hill Ave., Apt. 18, Brighton, Mass. 02136; Yury Fedosov, 30 Shishnov St. Apt. 73, Pushkin, Saint Petersburg, Russian Federation, 189620; Vladimir Vasiliev, 4 Telkinekaya St. Apt. 15, Saint Petersburg, Russian Federation, 195195; Victor Vasiliev, deceased, late of Saint Petersburg; by Nataly Vasliev, legal representative, 52 Gribbedov canal., Apt. 44, Saint Petersburg, both of Russian Federation, 190031; Oleg Gerasimov, 4 Shishhoy Apt.65, Saint Petersburg 192102, Russian Federation

[21] Appl. No.: 824,949

[22] Filed: Mar. 27, 1997

[51] Int. Cl.⁶ ...................................................... B65G 53/66

[52] U.S. Cl. .............................. 406/85; 406/153; 417/290; 417/306

[58] Field of Search ................................. 406/14, 85, 151, 406/152, 153; 15/319, 404, 419; 37/309, 311, 317, 320, 321

Primary Examiner—William E. Terrell
Assistant Examiner—Gene O. Crawford
Attorney, Agent, or Firm—Ilya Zborovsky

[57] ABSTRACT

In a method of and a device for suction transporting a material from an object surface, the suction transporting device has a suction unit and a unit for modulating the suction. A suction is applied to a transporting line by the suction unit so that a material is transported through the transporting line from an inlet to an outlet. A suction force of the suction produced in the transporting line is modulated by communicating an interior of the transporting line with atmosphere through a passage and periodically changing the area and the shape of the passage during the transporting. The frequency of the modulation is changed in dependence on the distance between the inlet of the transporting line and the object surface.

6 Claims, 3 Drawing Sheets

METHOD OF AND DEVICE FOR SUCTION TRANSPORTING

TECHNICAL FIELD

The present invention relates to a method of and a device for suction transporting, in which a suction force is used for transporting various materials by a carrier agent. More particularly, the present invention relates to method and devices which use a modulation of parameters of the suction stream of the carrier agent in order to increase the efficiency of the suction process for suction of materials to be transported from a surface to be cleaned, and in order to substantially reduce the force for displacement of a suction head along the surface. The latter effect is very important for various devices which use the suction transporting, such as for example vacuum cleaners, medical suction instruments and devices, and other hydraulic and pneumatic devices.

BACKGROUND ART

Methods and devices for suction transporting with a modulation of the stream of the above mentioned general art, disclose, for example in U.S. Pat. Nos. 5,201,877 and 5,593,252. The modulation of the parameters of the stream during suction transporting performed in these references is very efficient method in order to improve the process of suction of various materials from the surface to be cleaned. In this process, the most efficient frequency and characteristic of the modulation is given in a fixed manner with consideration of mechanical characteristics, the structure of the surface to be cleaned and the material to be transported, and the power of the suction device as well as a structure of its suction element.

In this method, the necessity to provide a required movability of suction with a permitted force for its displacement during a contact of the inlet of a suction line with a surface to be cleaned is taken into consideration. In the known method the fixed, predetermined maximal frequency of modulation of the stream parameters does not change during the process of suction in the zone of cleaning in dependence of a distance between the inlet and the surface to be cleaned. This fact limits the efficiency of the suction device in the process when the inlet approaches the surface to be cleaned, which is connected with a possible preliminary "tensioning" by the suction action and a low-frequency swinging (beating out) of the surface, as well as the material on it to be sucked.

In some cases during action on the structured (porous), uneven or movable surface to be cleaned it is necessary to provide a dynamic change of the frequency and characteristic of modulation of the suction stream parameters, with consideration of the changing rarification in the zone of the inlet when it passes a geometrically predetermined cleaning zone above the surface to be cleaned. It is important for example during vacuum cleaning of corner zones of the surface, curtains, clothing and other soft and movable surfaces, and also in the event of the use surgical medical suction instruments which act on thin, movable film surfaces, mucus, loosened fat zone, during neuro-surgical operations, etc.

Moreover, the provision of the constant high-frequency modulation of suction stream parameters even before entry of the inlet in the zone of a possible contact with the surface to be cleaned also limits in many cases the possibility of efficient and safe utilization of various devices for the known modulation method. Examples of this situation are various surgical medical suction instruments and devices for suction transporting of various media (plasma, fat, mucus, saliva, etc.) from local inner zones to be operated. Known devices in which the above described method of suction transporting with the stream modulation is performed do not provide for a possibility of automatic turning on (start) of modulation only when the inlet enters the geometrically predetermined cleaning zone, as well as automatic adaptive change (increase) of frequency of modulation when the inlet passes the zone in direction of the surface to be cleaned to a complete contact of the inlet with the surface.

These disadvantages substantially reduce the efficiency and limit the applications of the known methods and devices for suction transporting with a fixed modulation of the stream parameters.

SUMMARY OF THE INVENTION

Accordingly, it is an object of present invention to provide a method of and a device for suction transporting with a dynamic modulation of stream parameters, which provide for automatic start of a complex modulation of the stream parameters only when the inlet enters a geometrically predetermined zone of cleaning above a surface to be cleaned, and adaptive change of the modulation parameters.

In keeping with these objects and with others which will become apparent hereinafter, one feature of present invention resides, briefly stated, in a method of suction transporting, which has the steps of applying a suction to a transporting line by suction means so that a material is transported through the transporting line from an inlet to an outlet of said transporting line; modulating a suction force of the suction produced in the transporting line by communicating an interior of the transporting line with atmosphere through a passage, and periodically changing an area and a shape of the passage during the transporting; and changing a frequency of the modulation in dependence on a distance between the inlet of the transporting line and an object surface.

In accordance with another feature of present invention, a device for suction transporting has suction means for applying a suction to a transporting line so that a material is transported through the transporting line from an inlet to an outlet of said transporting line; means for modulating a suction force of the suction produced in the transporting line by communicating an interior of said transporting line with atmosphere through a passage, and periodically changing an area and a shape of said passage during transporting; and means for changing a frequency of the modulation in dependence on a distance between the inlet of the transporting line and the object surface.

When the method is performed and the device is designed in accordance with the present invention, it avoids the above mentioned disadvantages of the prior art and provides for the highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
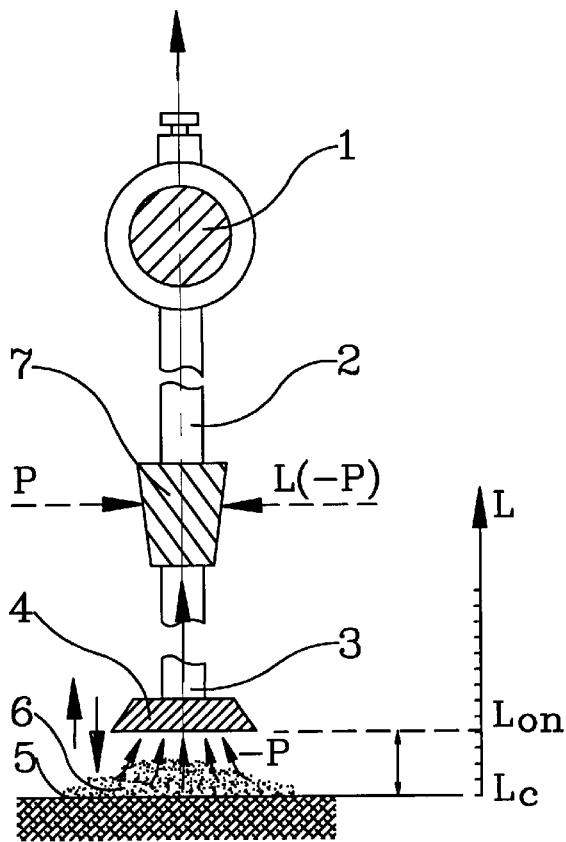
FIG. 1 is a view schematically showing a device for suction transporting with a dynamic modulation of stream parameters in accordance with present invention.

A suction transporting device shown in FIG. 1 includes a suction source 1, a transporting line 2 with an inner hollow 3, a suction inlet or nozzle 4 with an inlet opening located above a surface 5 which is to be cleaned and which contains a material 6 to be transported, and a modulator 7 which provides a dynamic modulation of stream parameters of suction transporting.

Figure 2:
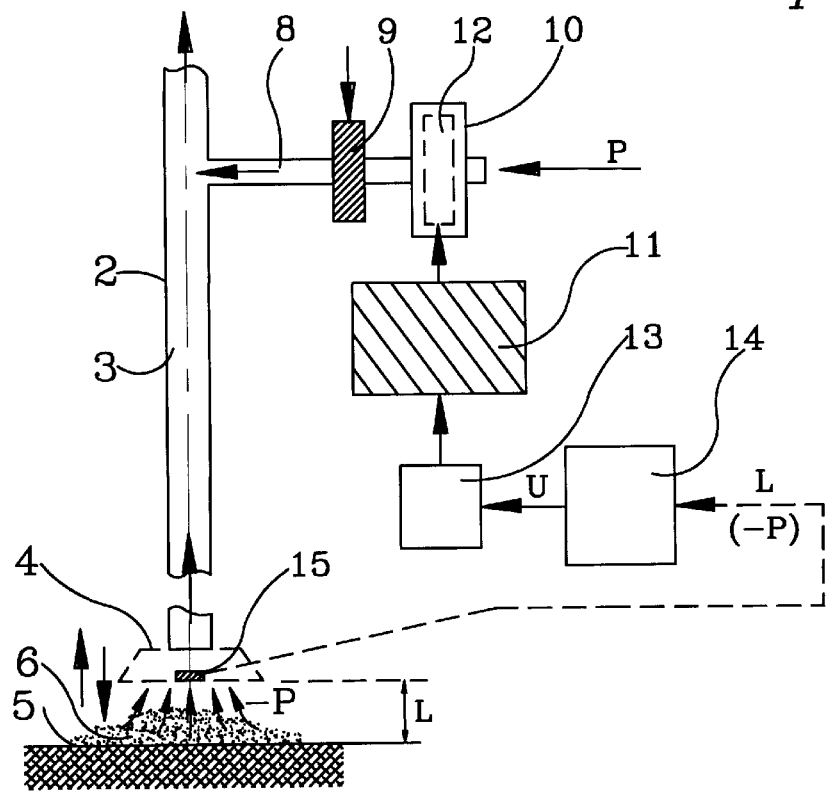
FIG. 2 is a view schematically showing a modulator for dynamic modulation of the stream parameters in the inventive suction transporting device.

The modulator 7 shown in FIG. 2 includes a passage 4 which connects the inner hollow 3 of the transporting line 2 with atmosphere, a correcting unit 9 for setting an initial area and shape of a minimal cross-section of the passage 8, a valve unit 10 for changing the initial area and shape of the passage 8 during modulation of the stream parameters of suction transporting. The modulator 7 further includes a power drive 11 for displacement of a movable element 12 of the valve unit 10 for periodic change of the initial area and shape of the passage 8, a regulator 13 of speed of the power drive 11, an automatic control unit 14 for controlling the speed regulator 13. The control unit 14 is designed so that when it acts on the speed regulator 13 of the power drive 11, the speed of the power drive 11 is changed from zero to a maximum value as a function of an input action on the control unit 14, connected with a value of a distance L between the surface 5 to be cleaned and the inlet 4.

The control unit 14 can be formed as an electrical, pneumatic, or mechanical control unit. It can include a sensor 15 for sensing a distance L between the inlet 4 and the surface 5 to be cleaned. The sensor can be formed as a capacitive, laser, ultra-sound and another sensor which determines a distance and is arranged for example on the edge of the inlet 4. The sensor 15 can be arranged also at different locations of the inlet 4 and calibrated in the values of L. In order to take into consideration during movement a possible angle of inclination between the surface in which the inlet opening of the inlet 4 is located and the surface 5 to be cleaned, n sensors 15 can be arranged on the inlet 4. Their signals are processed by the control unit 14 in order to correct the controlling action, which supplies it to the speed regulator 13.

The control unit 14 is formed so that it provides an output control action on the speed regulator 13 of the power drive 11, which in turn provides the value of the speed of the power drive such that it is equal zero during the displacement of the inlet opening of the inlet 4 in direction toward the surface to be cleaned and its entry in a geometrically predetermined cleaning zone (for example, a predetermined distance $L=L_{on}$ in FIG. 1), and the above mentioned value of the speed is equal to a maximum value when the full contact is reached between the inlet opening of the inlet 4 and the surface 5 to be cleaned ($L=L_c$). In addition, the control unit 14 must provide the possibility of maintaining the desired characteristic of the change of the control action U as a function L (U', U'', etc.). The predetermined characteristic of the speed change of the power drive from zero to the maximum value must be provided during entry and further displacement of the above mentioned inlet opening of the inlet 4 in the above mentioned cleaning zone (for example, from $L=L_{on}$ to $L=L_c$).

Figure 3:
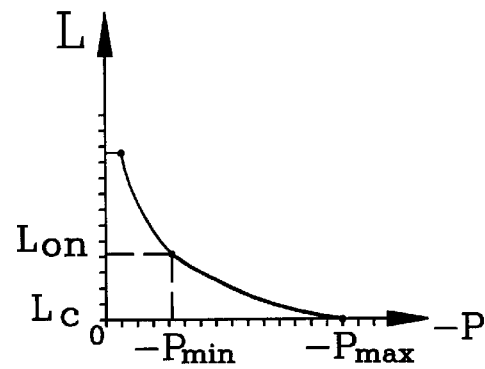
FIG. 3 is a view schematically showing an example of a change of rarification in the zone of inlet of the suction transporting device as a function of a distance between the inlet and a surface to be cleaned.
Figure 4:
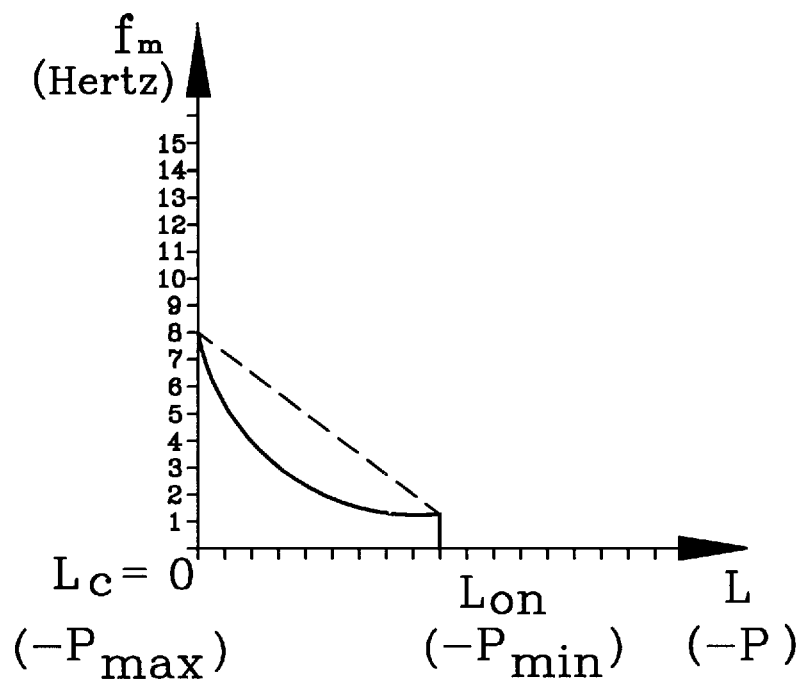
FIG. 4 is a view schematically showing examples of automatic adaptive change of a frequency of stream parameters modulation as a function of a distance between an inlet and a surface to be cleaned, or a rarification in the zone of the inlet.
Figure 5:
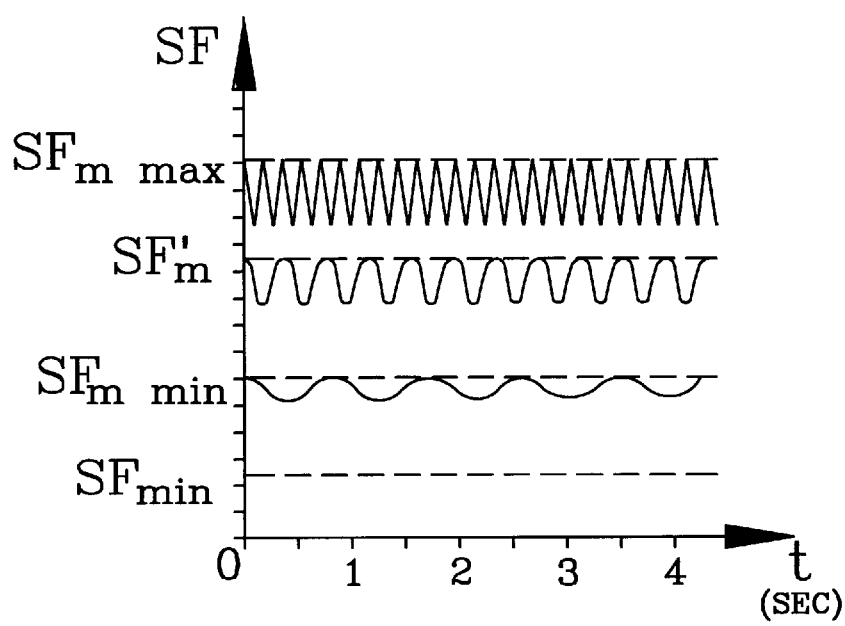
FIG. 5 is a view schematically showing examples of a change in time of a suction force in the zone of inlet of the inventive suction transporting device with a dynamic modulation of stream parameters, for several positions of the inlet above the surface to be cleaned.

The device for suction transporting with the dynamic modulation of stream parameters operates in the manner shown in FIGS. 3–5.

When the source of suction force 1 is turned on, a rarification is produced in the zone of the inlet opening of the inlet 4 and as a result a suction force is produced which displaces the stream of the carrier medium (for example air, gas, water, etc.) into the inlet opening of the inlet 4. The stream of the carrier medium passes the inner hollow 3 of the transporting line 2, through the modulator 7, the source of the suction force 1, to the outlet opening of the transporting line 2. When the inlet 4 is spaced at a distance from a predetermined cleaning zone ($L_{on}$), the rarifiaction value ($-P_{min}$) and corresponding the suction force ($SE_{min}$) in the zone of the inlet opening are minimal. When the inlet 4 approaches the cleaning zone, the value of rarification increases as shown in FIG. 3, and after it enters the cleaning zone ($L_{on}$) and until the full contact of the whole area of the inlet opening ($L_c$) of the inlet with the surface to be cleaned, the rarification value ($-P_{max}$) and the suction force ($SF_{max}$) reach their maximum values.

When the inlet 4 displaces in direction toward the surface 5 to be cleaned, the distance between them is sensed by a sensor or a sensor system 15 of the control unit 14. When the inlet opening of the inlet 4 reaches the geometrically predetermined upper limit of the cleaning zone ($L=L_{on}$), the output control signal of this unit turns on the power drive 11 through the speed regulator 13.

The geometrical determination of the cleaning zone is performed, for example, by selection ($L_{on}$) in the control unit 14. In turn, the value $L_{on}$ is selected with the consideration of the specifics of the objects to be cleaned since they can be from several feet, such as for example in industrial hydraulic and pneumatic transporting systems or inches, such as for example in household vacuum cleaning systems, to tenth of inches, for example in medical suction instruments and devices.

The change of speed of the power drive 11 by the control unit 14 as a function of the distance L leads in turn to the change of the speed of displacement of the movable element 12 of the valve unit 10, which in turn provides for a periodic change of the initial area and shape of the passage 8. The latter leads to the periodical change of a communication between the atmosphere and the inner hollow 3 of the transporting line 2 in accordance with the predetermined characteristic. The change of the communication in accordance with the corresponding characteristic causes, (as a result, due to the change of suction of atmospheric air into the inner hollow 3 of the transporting line 2) the change of the value of rarification (–P) in the zone of the inlet opening of the inlet 4, and as a result of the value of suction force (SF) at the inlet of the device for suction transporting. In this process the initial minimal frequency of modulation of stream parameters $f_{mmin}$ is provided. The control unit 14 changes its controlling action U as a function of L so that when $L=L_c$ the speed of the power drive 11 reaches a maximum value. The frequency of change of the initial area and shape of the passage 8 and therefore the frequency of modulation or change of the suction force and all stream parameters also reach the maximum value $f_{mmax}$.

The examples of automatic change of the frequency of modulation of stream parameters as a function of the distance L are shown in FIG. 4. The characteristic of the change $f_m=f(L)$ is determined by the law of transformation of information $U=f(L)$ which is predetermined in the control unit 14. This law is selected and predetermined initially taking into consideration the type of the object to be cleaned, structural and mechanical characteristics of the material of the surface 5 to be cleaned, and of the material 6 transported from it.

FIG. 5 shows the examples which illustrate the process of change of the suction force in the zone of the inlet opening of the inlet 4 of the device for suction transporting with the dynamic modulation of stream parameters, for several positions of the inlet in the cleaning zone relative to the surface to be cleaned. In particular, it shows a moment of turning on of the device for suction transporting as $SF_{min}$, a moment of entry by the inlet opening of the inlet 4 in the cleaning zone as $SF_{mmin}$, one of the moments of passage by the inlet 4 of the cleaning zone as $SF^1_m$, and the moment when the inlet opening of the inlet 4 reaches a full contact with the surface 5 to be cleaned as $SF_{mmax}$.

The movable element 12 of the valve unit 10 can be for example ring-shaped or flat and can perform a rotary or longitudinal displacement under the action of the power drive 11 relative to the throughgoing opening of the immovable housing of the valve unit 10. The correcting unit 9 can be also formed as one or several movable ring-shaped or flat strips of different shape. By changing the fixed position of the strips relative to the cross-section of the passage 8, its initial shape and its minimum cross-section is provided. The parameters and shape of this cross-section, as well as the shape of the movable element 12 and the throughgoing opening of the immovable housing of the valve unit 10 determine the law of change in time of the communication of the inner hollow 3 of the transporting line 2 with the atmosphere. As a whole, this determines the law of change of the stream parameters of the suction transporting during the process of modulation by the modulator 7.

As explained hereinabove, in some cases the value L does not permit obtaining of an exact evaluation of the position of the inlet opening of the inlet 4 relative to the surface 5 to be cleaned, or relative to the transporting material 6 which is uniformly located on it. In these situations the control of rarification in the zone of the inlet opening of the inlet 4 during passage of a predetermined cleaning zone provides an efficient average evaluation. The present invention has for this purpose another embodiment for the control unit 14 of modulator 7. In this embodiment the sensor of the sensor system 15 is formed as a pressure sensor for sensing rarification (–P) in the above mentioned zone of the inlet opening of the inlet 4. The control unit determines and realizes the control function $U=f(-P)$ with the selection of $(-P_{on})$ which provides formation of the controlling action for the speed regulator 13 in order to turn on the power drive 11 in the moment of passage by the inlet opening of the inlet 4 of a border of the cleaning zone, and when the value of rarification $-P_{on}$ is reached in the zone of this opening. When the value of rarification $-P_{max}$ is reached, the controlling action from the control unit 14 provides a maximum speed of the power drive 11, and therefore as a result a maximum frequency of modulation of the suction force $SF_{mmax}$ and other stream parameters.

Therefore in the first embodiment of the control unit 14, an automatic adaptive change of frequency modulation of the stream parameters is performed as $f_m=f(L)$, and in the second embodiment is performed as $f_m=f(-P)$.

At the same time the value of rarification (–P) in the zone of inlet opening of the inlet determines the value of the pressure drop difference between the atmosphere (P) and the zone of the inner hollow 3 of the transporting line 2, where the modulator 7 is arranged. In this case the rarification sensor 15 can be arranged directly in the modulator 7 so as to provide a control of the value of rarification directly in the zone of location of the modulator in the inner hollow 3 of the transporting line 2. Its graduations are made with the consideration of the possible loss of the value of rarification at the section of the transporting line 2 from the inlet opening of the inlet 4 to the zone of location of the modulator 7.

If the modulator 7 utilizes the pneumatic power drive 11, the control unit 14 can be made without the sensor 15 for sensing the value of rarification in the zone of the modulator. In this case, the difference of pressure between atmosphere and the inner hollow 3 of the transporting line 2 is applied directly to the power drive 11 where the modulator 7 with the drive is arranged. This is the third embodiment of the modulator for dynamic modulation of the stream parameters for the suction transporting. It includes all above mentioned units and elements with the exception of the sensor 15 as a separate unit. In this embodiment, the structure of the pneumo-mechanical system of this mobile pneumatic modulator performs the function of the sensor.

Figure 6:
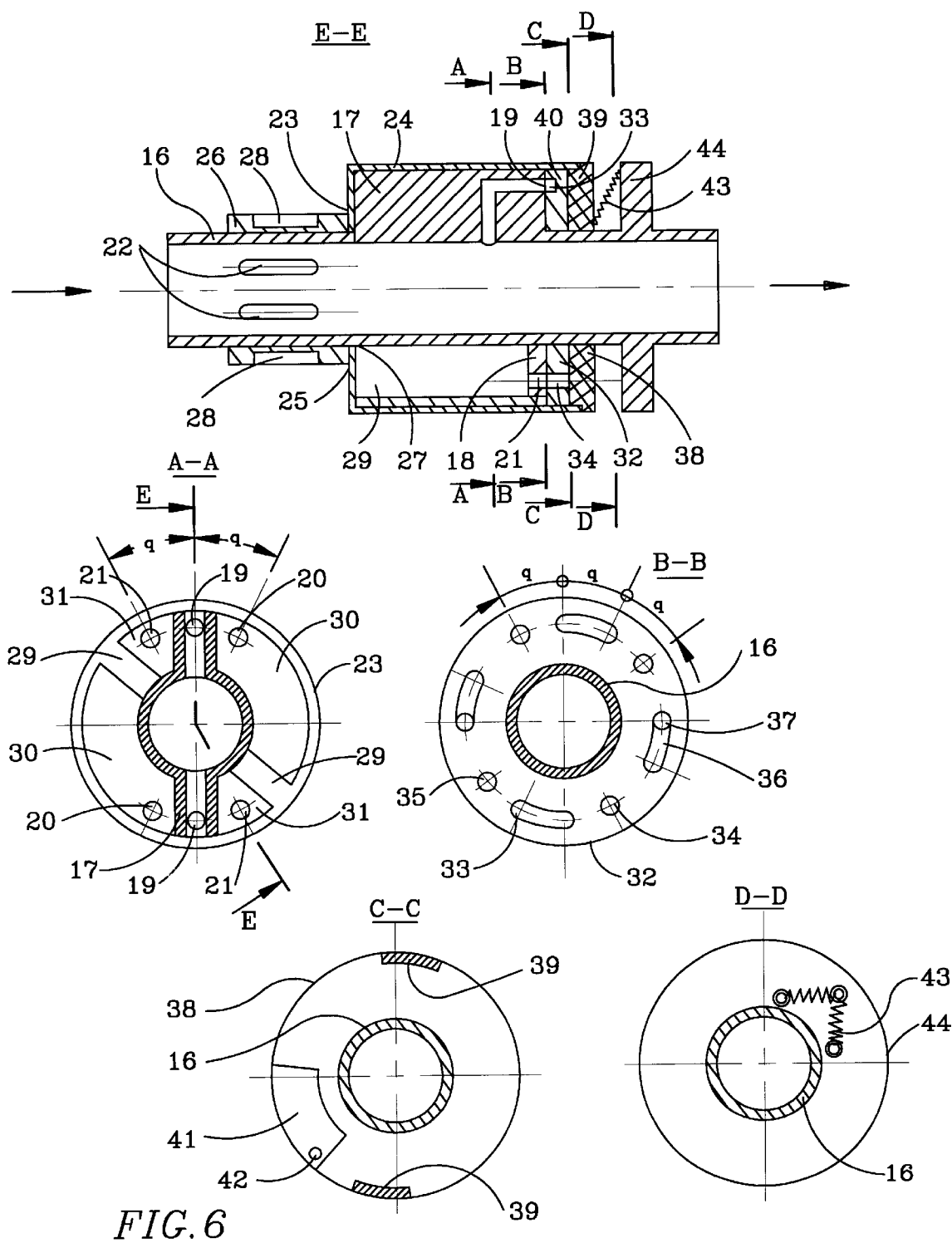
FIG. 6 is a view schematically showing a modulator with a pneumatic "pendulum" type power drive of its valve unit, for dynamic modulation of stream parameters in the inventive suction transporting device.

FIG. 6 shows an example of such a modulator with the pneumatic power drive of a pendulum type. The modulator is formed in the following manner. Oppositely located ribs 17 are arranged on the outer surface of the portion of the pipe 16 along its axis, while the ends of the pipe 16 have corresponding sizes for connection to the transporting line 2. Also, a disk 18 adjoining one of the end surfaces of the ribs 17 is provided. The disk 18 can be formed of one piece with the ribs 17 as shown in FIG. 6. A central opening 19 is formed in disk 18 opposite to each of ribs 17 and connects through a knee-shaped passage inside the rib 17, an inner space of the pipe 16 with the edge of the disk 18 which is opposite to the ribs. In addition, the disk 18 is provided with side openings 20 and 21 which are located symmetrical relative to the central openings 19. Also, in the portion of the pipe 16 there are openings 22 for suction of atmospheric air into the inner hollow during the operation of the modulator.

Moreover, the modulator has a "pendulum" 23 formed as a cup 24 with a bottom 25 and a shell 26 coaxially attached to the cup 24. An opening 27 is provided in the bottom 25 and has a diameter which is equal to the inner diameter of the shell 26. The latter diameter is selected so as to provide a minimum possible gap between the portion of the pipe 16 and the shell 26, which is sufficient for a free turning of the "pendulum" 23 around the portion of the pipe 16. Openings 25 are formed in the shell for passage of the atmospheric air through the opening 22 of the portion of the pipe 16 into the inner hollow of the transporting line 2. Two oppositely located identical ribs 29 are provided on the inner surface of the cup 24. When the "pendulum" 23 is arranged adjoining to the disk 18, they form (together with the ribs 17, the disk 18 and the bottom 25 of the cup 24), two pairs of axes-symmetrical hollows 30 and 31. The angle of turning of the "pendulum" is limited for example by the thickness of the ribs 29 or special projections on them, so that the openings 20 and 21 are always connected with the corresponding hollow 30 and 31.

The modulator further has a valve member 32 formed as a ring and freely arranged on the portion of the pipe 16 at the side of the disk 18. The valve member 32 at the surface facing the disk 18 has oppositely located concentric cutouts 33, with throughgoing openings 34 and 35 arranged at their both sides. The openings 19, 20, 21 of the disk 18 and the cutouts 33 and the openings 34, 35 of the valve member 32 are formed at an equal radial distance relative to the axis of the device. The angular distance between the openings 19 and 21, the angular length of the cutout 33 as well as the angular distance from it to the openings 34 and 35 are equal and correspond to the value "q" shown in FIG. 6. This provides the necessary location of these elements during the operation of the device.

In order to limit the turning angle of the valve member 32, it is provided with arcuate openings 36 which engage with pins 37 mounted on the disk 18. The sizes of the openings 36 and the pins 37 determine the limiting angle of turning of the valve member 32 which is equal to "q".

The modulator also has a switch 38 of the valve member 32, which is formed as a ring freely arranged on the portion of the pipe 16 at the side of the valve member 32. The switch 38 is provided at its outer edge with projections 39 which engage slots 40 of the cup 24 of the "pendulum" 23 with a free stroke. It also has a slot 41 which engages, with a free stroke, a pin 42 arranged on the valve member 32, so as to provide the engagement of the switch 38 and the valve member 32 (also with the free stroke). The switch 38 has a mechanism which ensures its two stable end positions. This mechanism includes a spring element 43 with one end fixed to the switch 38 and the other end fixed to the limiting flange 44, which also performs the function of fixing a protective hood for the modulator as a whole, not shown in FIG. 6. The mounting of the element 43 is performed so that in a medium angular position of the switch 38, the locations of mounting of the elements 43 are arranged in one radial direction. In this case the medium angular position of the switch 38 is unstable, while the end positions (one of them is shown by a broken line) are stable because of the force of the preliminarily compressed spring element 43.

The modulator operates in the following manner.

In the initial position the switch 38 as well as the valve member 32 are located in one of their end positions, as shown for example in FIG. 6. The openings 22 in the portion of the pipe 16 are closed by the shell 26 and the suction of the atmospheric air into the transporting line 2 is not possible. When the inlet 4 enters the cleaning zone, a rarification is generated in the portion of the pipe 16 and it reaches and exceeds a predetermined threshold ($-P_{on}$). Since the inner space of the portion of the pipe 16 is connected by the central openings 19 of the disk 18, the cutout 33 of the valve member 32, and the openings 20 of the disk 18 with the hollow 30, the rarification is provided also in the hollow 30. During this time, the air pressure in the other hollows 31 is equal to the atmospheric pressure since they are connected with the atmosphere through the openings 21 of the disk 18 and the opening 34 of the valve member 32. In other words, the air pressure in the hollows 31 will exceed the air pressure in two other hollows 30. Under the action of the pressure difference, the "pendulum" 23 starts turning. After the "pendulum" 23, when the free stroke of engagement formed by the slots 40 of the cup 24 and the projection 39 of the switch 38 is compensated, the switch 38 starts turning as well. When the switch 38 turns from its end position, the spring element 43 is compressed so as to store energy, and after passage by the switch 38 of the medium position it starts relaxing so as to turn the switch 38 further to the other end position. Simultaneously, at the end of the turning of the switch 38, when the free stroke of engagement formed the slot 41 of the switch 38 and the pin 42 of the valve member 32 is compensated, the valve member 32 turns by an angle "q" to its other end position. In this position the air rarification is produced already in the other hollows 31 since they are connected with the inner surface of the portion of the pipe 16 by the openings 19 of the disk 18, the cutouts 33 of the valve member 32, and the openings 21 of the disk 18. The atmospheric pressure is produced now in the hollows 30 in this moment due to the openings 20 of the disk 18 and the openings 35 of the valve member 32, and the process of turning of the "pendulum" 23, the switch 38 and the valve member 32 is repeated in opposite direction. The modulation of the air stream because of the change of the suction of the atmospheric air into the transporting line is performed during turning of the "pendulum" 23 in the process of displacement of the openings 28 of the shell 26 and the openings 22 of the portion of the pipe 16 relative to one another.

Therefore the modulator is turned on automatically only when the inlet approaches the surface 5 to be cleaned at the moment of entry into the predetermined cleaning zone. The frequency of the modulation is increased automatically in dependence on the degree of approaching of the inlet 4 to the surface 5 to be cleaned, since with the increase of the pressure difference in the hollows 30 and 31, the angular speed of turning of the movable elements of the "pendulum" 23 (the power drive of the "pendulum" type) of the modulator is increased. This in turn leads to the increase of the frequency of opening and closing of the openings 22 of the portion of the pipe 16 (as in the immovable housing of the valve unit 10) due to the increasing angular speed of the reciprocating movement (relative to them) of the shell 26 with the openings 28 (as the movable element 12 of this valve unit).

The functional correcting unit 9 (FIG. 2) is not shown in this example of the modulator (FIG. 6) for the purpose of simplification. At the same time such unit can be formed for example in the modulator as a movable ring located on the surface of the shell 26. The ring can have a width which is sufficient for the partial overlapping of the openings 28 of the shell 26 during fixation of the required position of the ring along the shell. The ring can be also formed as a turning ring with cutouts of a predetermined shape, so as to provide a fixed change of the shape and area of the minimal throughgoing section of the openings 28 overlapped by the ring. The initial shape and the minimal area of the cross-section of the passage 8 of the modulator 7 is therefore predetermined, when the positions of the corresponding openings 22 and 28 coincide during the angular reciprocal movement of the "pendulum" mechanism of the modulator (FIG. 6). The same principle can be used to determine the shape of change in time of the communication of atmosphere with the inner hollow of the portion of the pipe 16 as well as the transporting line 2, which in turn determines a characteristic of the modulation of stream parameters of the suction transporting.

In the Example shown in FIG. 6 for the modulator providing the dynamic modulation of stream parameters, it is possible by selection or change of tensioning of the spring element 43, to determine the moment of turning on of the modulator at the value of rarification $-P_{on}$. It is also possible to regulate the speed of the power drive (which is formed in this example as a "pendulum" type power drive), to perform the function of the control unit 14 and the speed regulator 13 of FIG. 2. It is possible also to use other factors, such as for example the change of size of the hollows 30 and 31, of the cutouts 33 of the valve member 32, and of the openings 20 of the disk 18 as shown in FIG. 6. The latter elements of the modulator functionally take up and transmit to the system "pendulum-switch" a value of rarification (−P) which is produced in the zone of location of the portion of the pipe 16 in the transporting line 2. Therefore, they indirectly perform the function of a pressure sensor (rarification) 15 of FIG. 2. Thus, the modulator with the pneumatic power drive of "pendulum" type of the movable element has all components which are necessary to form a modulator with dynamic modulation stream parameters in a suction transporting device of FIG. 2. In such pneumatic modulators, also other construction can be used to realize the same principle. It is also possible to provide a pneumatic power drive operating with the use of changing pressure difference between the atmospheric pressure and the rarification in the inner hollow of the suction line as a function of the changing position of the inlet opening of the inlet 4 relative to the surface 5 to be cleaned. Another example of pneumatic modulator can be a modulator of a linear type with a throttled linear power pneumatic drive.

The tests of the pneumatic modulators for dynamic modulation of stream parameters of suction transporting showed that the above mentioned pressure difference which is applied to its pneumatic drive formed for example as a "pendulum" drive is a complex function of:

a distance of the inlet 4 from the surface 5 to be cleaned or the material 6 as well as from a place of the modulator along the length of the transporting line 2;

degree of clogging of the inlet 4 and the transporting line 2;

structural and mechanical characteristics of the surface 5 to be cleaned and the material 6 to be transported;

quality of contact of the inlet 4 with the surface 5 to be cleaned or the compacted material 6.

Also, the above mentioned pressure differential depends on a construction of the suction nozzle. During tests of the modulator on a vacuum cleaner with the power 1,200 Bt which operated with a floor attachment having a flexible member formed as a brush over its perimeter, the operative pressure differential was reducing. The shaped throttling cavities which exclude a full contact of the working surface of the furniture attachment with the surface to be cleaned also led to the reduction of the operating pressure difference.

A furniture attachment was used for cleaning of curtains during this process a complete contact of the curtains to the attachment was provided, and the whole air was sucked through the fabric. In all three cases, the maximum frequency of modulation of the suction force of vacuum cleaner was automatically adjusted or adapted, to reach values correspondingly 2–3 Hz, 5–6 Hz, and 8–10 Hz. It should be also mentioned that even the freely hanging curtains were not pulled into the inlet of the vacuum cleaner. The loss of hydraulic power which is spent for the operation of the testing sample of the modulator was not more then 3–4% and the loss connected with the periodic communication of the inner hollow of the transporting line with the atmosphere did not exceed 5–8%. At the same experiments by several tens percentage points, and the force required for movement of the inlet relative to the surface to be cleaned was reduced 2–3 times. During the tests the efficiency of change of the suction force within the range up to 40% from its maximal value (for corresponding position of the movable inlet in the cleaning zone) was confirmed. The frequency of modulation of the stream parameters in dynamic process was changing within the range of 0–30 Hz. Various characteristics of modulation can be provided by the correcting unit of the modulator, for example sine-shaped, trapezoidal and other more complicated characteristics.

The tests showed that the absence of the modulation before the moment of entry by the inlet into the cleaning zone made possible a preliminary stress ("pulling") in the structure of the surface to be cleaned or in the compacted material. This provides for additional favorable conditions for the preliminarily destruction of the "coarse" connections between them. Moreover, the absence of the modulation before entry of the inlet into the zone of the desired action increases the possibilities and safety of the use of such dynamic modulation of the suction transporting stream, for example in medical surgical instruments which use suction transporting.

The relatively low-frequency modulation during the period of passage by the inlet of the pre-contact zone increases the effect of "swinging" ("shaking") of the surface to be cleaned or large deposits of the material to be transported so as to destroy their inner connection. The relatively high-frequency modulation which is produced during the moment of contact of the inlet with the surface to be cleaned destroys the connections between the particles of the material, "swings" the particles and drag them by the transporting carrier into the inlet ("agitating" effect).

The dynamic modulation of the stream parameters also provides for the following advantages:

clogging (layer deposits) in the transporting line is reduced;

operation of the filtering device, if it is arranged on the way of the stream, is improved because logging of the structural pores of the filtering material as well as pouring of the transported material during the frequency-mechanical vibration of the filtering material are reduced;

additional noise information is obtained in many instances, which follows the process of dynamic modulation of the suction stream and allows the operator (in view of the change of frequency of modulation during movement of the inlet in the cleaning zone) to be oriented for selection of the position of the inlet relative to the surface to be cleaned, as well as to objectively evaluate the degree of clogging of the inlet and the transporting line.

The device for suction transporting in accordance with the present invention has low energy consumption, operates practically noise free, is compact and mobile, has broad functional possibilities, is easy to install and to use. With the use of the new method and the device of suction transporting with dynamic modulation of stream parameters, energy-related, functional, operational and ecological characteristics of many industrial, household and medical devices and systems can be improved.

It will be understood that each of the elements described above, or two or more together, may also find a useful application in other types of constructions and methods differing from the types described above.

While the invention has been illustrated and described as embodied in method of and device for suction transporting, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

Moreover, the new suggested method of modificatoin of suction trnasporting stream parameter modulation frequency opens significantly innovative ways of constructing devices inmplementing it, with additional capabilities in separating the material transported from the surface to be cleaned.

We claim:

1. A method of suction transporting, comprising the steps of applying a suction to a transporting line by suction means so that a material is transported from an object surface through the transporting line from an inlet to an outlet of said transporting line; modulating a suction force of the suction produced in the transporting line by communicating an interior of the transporting line with atmosphere through a passage, and periodically changing an area and a shape of the passage during the transporting; and changing a frequency of the modulation in dependence on a distance between the inlet of the transporting line and the object surface.

2. A method as defined in claim 1, wherein said changing includes changing the frequency of the modulation from zero to maximum from a given maximal distance of said inlet from the object surface to a zero distance from said inlet to the object surface corresponding to a complete contact between said inlet and the object surface.

3. A method as defined in claim 1, wherein said changing the frequency of the modulation includes changing the frequency in dependence on changes of rarification in an area of said inlet during displacement of said inlet relative to the object surface, which changes of rarification correspond to changes of the distance between said inlet and the object surface.

4. A device for suction transporting, comprising suction means for applying a suction to a transporting line so that a material is transported from an object surface through the transporting line from an inlet to an outlet of said transporting line; means for modulating a suction force of the suction produced in the transporting line by communicating an interior of said transporting line with atmosphere through a passage, and periodically changing an area and a shape of said passage during transporting; and means for changing a frequency of the modulation in dependence on a distance between the inlet of the transporting line and the object surface.

5. A device as defined in claim 4, wherein said means for changing a frequency of the modulation include means for changing the frequency of the modulation from zero to maximum and from a given maximal distance of said inlet from the object surface to a zero distance of said inlet to the object surface corresponding to a complete contact between said inlet and the object surface.

6. A device as defined in claim 4, wherein said means for changing a frequency of the modulation include means for changing the frequency of the modulation in dependence on changes of rarification in an area of said inlet during displacement of said inlet relative to the object surface, which changes of rarification correspond to changes of the distance between said inlet and the object surface.

* * * * *